United States Patent
Payne

(10) Patent No.: US 7,408,317 B2
(45) Date of Patent: Aug. 5, 2008

(54) APPARATUS HAVING A MOTOR, CONTROLLER FOR THE MOTOR, AND METHOD OF CONTROLLING THE MOTOR

(75) Inventor: Stephen M. Payne, Waukesha, WI (US)

(73) Assignee: Wildeck, Inc., Waukesha, WI (US)

( * ) Notice: Subject to any disclaimer, the term of this patent is extended or adjusted under 35 U.S.C. 154(b) by 60 days.

(21) Appl. No.: 11/381,476

(22) Filed: May 3, 2006

(65) Prior Publication Data

US 2006/0250102 A1      Nov. 9, 2006

Related U.S. Application Data

(60) Provisional application No. 60/677,725, filed on May 4, 2005.

(51) Int. Cl.
    *G05B 1/06* (2006.01)
(52) U.S. Cl. ........................ 318/638; 318/639
(58) Field of Classification Search ............ 318/638, 318/639
    See application file for complete search history.

(56) References Cited

U.S. PATENT DOCUMENTS

| | | | | |
|---|---|---|---|---|
| 4,652,801 A * | 3/1987 | Burdett | ................. | 318/481 |
| 5,063,740 A * | 11/1991 | Aihara | ................. | 60/432 |
| 5,210,476 A * | 5/1993 | Kazato | ................. | 318/560 |
| 5,220,259 A * | 6/1993 | Werner et al. | ................. | 318/432 |
| 5,334,876 A * | 8/1994 | Washeleski et al. | ...... | 307/10.1 |
| 6,124,692 A * | 9/2000 | Canada et al. | ............ | 318/490 |
| 6,465,980 B1 * | 10/2002 | Orsat | ................. | 318/466 |
| 6,936,991 B2 * | 8/2005 | Chen et al. | ................. | 318/700 |
| 6,949,906 B2 * | 9/2005 | Boscolo et al. | ............ | 318/599 |
| 7,053,583 B1 * | 5/2006 | Hazelton | ............. | 318/400.03 |
| 7,190,137 B2 * | 3/2007 | Lelkes | ................. | 318/400.23 |
| 7,196,486 B2 * | 3/2007 | Nakamura et al. | ....... | 318/469 |
| 2002/0120362 A1 * | 8/2002 | Lathan et al. | ............ | 700/245 |
| 2004/0263342 A1 * | 12/2004 | Matlock et al. | ........... | 340/648 |
| 2006/0186842 A1 * | 8/2006 | Negoro et al. | ............ | 318/139 |
| 2006/0221518 A1 * | 10/2006 | Evans et al. | ............ | 361/23 |
| 2006/0290307 A1 * | 12/2006 | Mullet et al. | ............ | 318/466 |
| 2007/0113595 A1 * | 5/2007 | Harwood et al. | ......... | 68/12.01 |

* cited by examiner

*Primary Examiner*—Lincoln Donovan
*Assistant Examiner*—Thai Dinh
(74) *Attorney, Agent, or Firm*—Michael Best & Friedrich LLP

(57) ABSTRACT

A method, and a system of using the method, of controlling a motor having a rated capacity. The method includes determining the motor has been started, determining a plurality of operating parameters of the motor after the motor has started, determining a threshold from a portion of the operating parameters, comparing one of the determined operating parameters with the threshold, and operating the motor at a level corresponding to below the rated capacity when one of the determined operating parameters is greater than the threshold. When an electric motor having a control system according to the present invention lifts a load, drives a machine, or starts other motions, the control system automatically adjusts to a power level that corresponds to the load. In this way, the motor will not be allowed to exert any power or force to the load in excess of what is necessary. If the machine being driven becomes jammed, binds, or draws more power for some unexpected reason, the motor will be shut down to reduce or to limit damage to the load or the machine.

9 Claims, 3 Drawing Sheets

APPARATUS HAVING A MOTOR, CONTROLLER FOR THE MOTOR, AND METHOD OF CONTROLLING THE MOTOR

RELATED APPLICATION

This application claims the benefit of prior-filed, U.S. Provisional Patent Application Ser. No. 60/677,725 filed on May 4, 2005, the entire content of which is incorporated by reference herein.

BACKGROUND

The invention relates to a controller for a motor, and particularly, a controller having a load overload device.

To comply with the National Electrical Code, NFPA 70, electric motors larger than one horsepower are required to use overload devices. The overload devices are intended to protect electric motors and branch circuits from undue heating caused by excessive current.

Induction electric motors are widely used. Induction motors are generally specified by a variety of rated capacity parameters such as torque, horsepower, current, voltage, frequency, temperature, starting time, and the like. While induction motors have a simple robust physical design, induction motors rely on complex nonlinear relationships to function. For example, when an inductive motor is first turned on to drive a machine, the inductive motor can draw an additional amount of current to provide additional torque to drive the machine. The additional amount of current drawn is generally referred to as an inrush current that can last for a few seconds. The inrush current can sometimes be ten times higher than that of a normal running current. The additional torque can sometimes be three times that of a normal operating torque. After the driven machine reaches a normal operating state or speed, the current drawn will drop below the name plate current value or rated current capacity.

However, when the machine being driven becomes jammed or impaired in some manner, the motor will draw additional current or power to churn out additional torque in an attempt to move the machine. When the amount of the operating current drawn by the motor exceeds a certain rated amount, an overload device associated with the machine will trip. For example, an overload of about 125 percent of the rated current of the motor for about 600 seconds, or about 600 percent of the rated current of the motor for about ten seconds will trip the overload device. However, the additional torque can last for a period of time before the overload device trips. While the machine being driven is jammed or impaired and before the overload device trips, the jammed machine can destroy any jammed material or itself.

SUMMARY

While methods using sensors to detect overload in a jammed machine exist, these methods use a fixed overload set-point. In such cases, an associated overload device trips only when a current drawn exceeds the fixed overload set-point. As a result, a motor with the fixed overload set-point continues to deliver full torque when jammed during steady-state operation before the current drawn exceeds the fixed overload set-point. For example, a 10,000-lb. material lift with a fixed set-point overload exerts about 10,000 lbs. onto any associated structure when the lift is unloaded and becomes jammed. The amount of force exerted by the machine can be destructive.

When an electric motor having a control system according to the present invention lifts a load, drives a machine, or starts other motions, the control system automatically adjusts to a power level that corresponds to the load. In this way, the motor will not be allowed to exert any power or force to the load in excess of what is necessary. If the machine being driven becomes jammed, binds, or draws more power for some unexpected reason, the motor will be shut down to reduce or to limit damage to the load or the machine.

Accordingly, in one construction, the invention provides a controller for a motor, where the controller includes a load overload device. For example, the load overload device can be a jam overload device for a vertical lift. The controller variably sets a value of the load overload device each time the motor starts up, rather than having a fixed overload set point. This provides a more flexible jam load overload device. The device may or may not include any National Electric Code ("NEC") overload protection as described.

In one construction, the invention provides a method of controlling a motor that has a rated capacity. The method includes determining the motor has been started, and determining a plurality of operating parameters of the motor after the motor has started. The method also includes determining a threshold from a portion of the operating parameters, and comparing one of the determined operating parameters with the threshold. The method also includes operating the motor at a level corresponding to below the rated capacity when one of the determined operating parameters is greater than the threshold.

In another construction, the invention provides a method of controlling a motor that has a rated capacity. The method includes determining the motor has been started, and determining values of an initial set of operating parameters of the motor after the motor has started. The method also includes determining a statistical value of the values of the initial set of operating parameters, and adapting a set-point to the statistical value. The method also includes determining a value of a subsequent operating parameter of the motor after the values of the initial set of operating parameters have been determined, determining a difference between the value of a subsequent operating parameter and the set-point, and stopping the motor when the difference is above an overload threshold for a period of time.

In yet another construction, the invention provides a control system for a motor that has a rated capacity. The system includes a sensing module and a controller. The sensing module determines a plurality of operating parameters of the motor after the motor has started. The controller determines a threshold from a portion of the operating parameters, compares one of the sensed operating parameters with the threshold, and operates the motor at a level that corresponds to below the rated capacity when one of the sensed operating parameters is greater than the threshold for a period of time.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "controller" and "processor" may include or refer to both hardware and/or software. Furthermore, throughout the specification capitalized terms are used. Such terms are used to conform to common practices and to help correlate the description with the examples, and/or drawings. However, no specific meaning is implied or should be inferred simply due to the use of capitalization. Thus, unless specifically indicated otherwise, the claims should not be limited to the specific examples or terminology or to any specific hardware or software implementation or combination of software or hardware.

Figure 1:
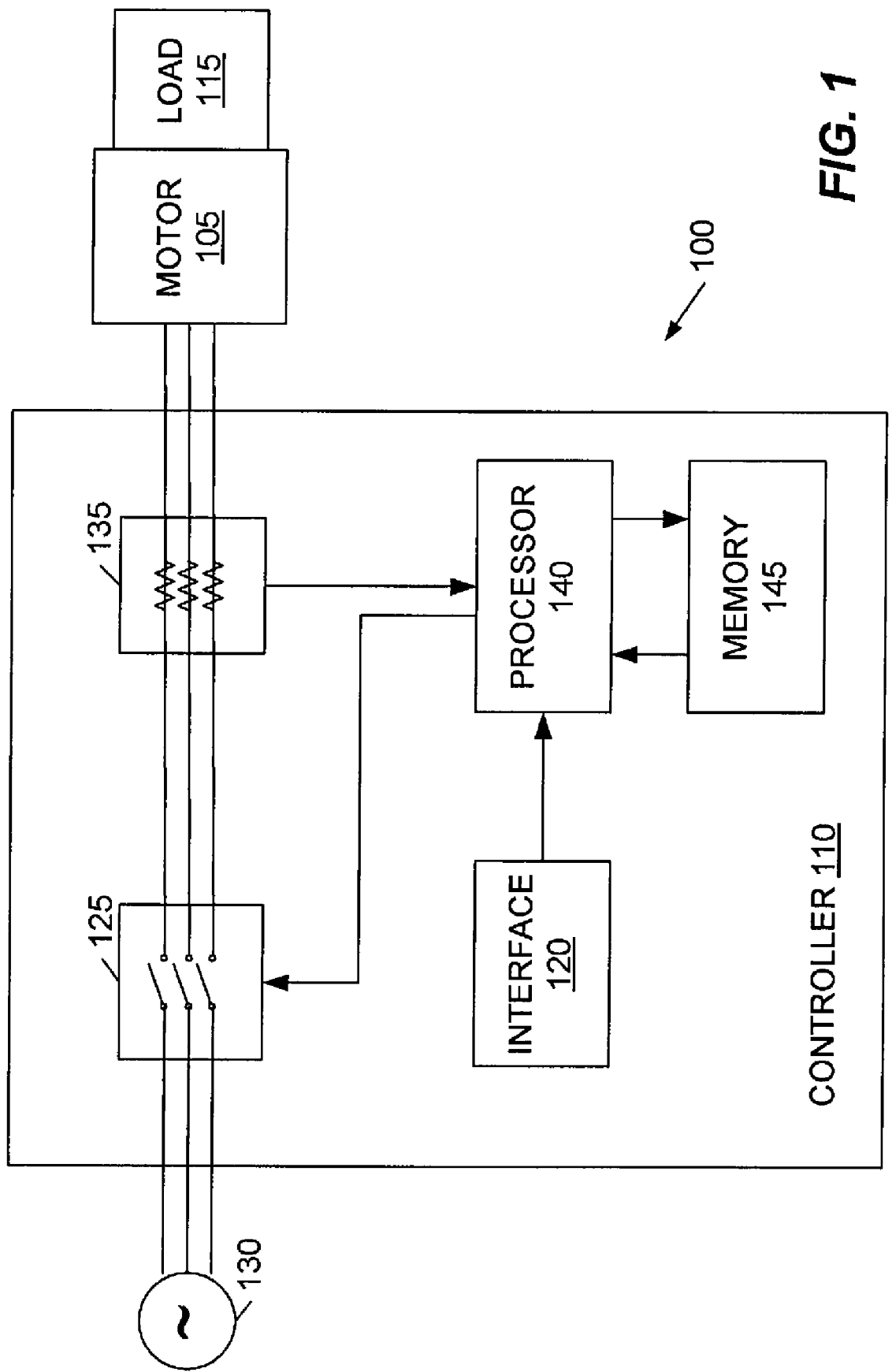
FIG. 1 is a schematic representation of an apparatus or system incorporating the invention.

FIG. 1 schematically represents an apparatus 100 incorporating the invention. For example, the apparatus 100 can be a vertical reciprocating conveyer. Other exemplary apparatuses include water pumps, industrial mixers, air blowers, extruders, cranes, elevators, and the like. As shown in FIG. 1, the apparatus 100 includes a motor 105, a controller 110 for controlling the motor 105, and a driven machine or load 115 supported by the apparatus 110. As will be discussed further below, the driven load 115 receives mechanical output produced by the motor 105.

The motor 105, in the construction described herein, is a three-phase induction motor. However, the invention is not limited to a three-phase induction motor. Instead, the invention can be used with almost any motor type having a relationship between the current of the motor 105 and the torque of the motor 105. Other example motor types include, but are not limited to, single-phase induction motors, synchronous motors, direct current motors, etc. As is commonly known, the motor 105 receives electrical power from the controller 110 and produces a mechanical power in response thereto. The mechanical power is provided to the load 115 attached to the motor 105. The load 115 can be, for example, a mechanical load having a mechanical movement and/or a material that is processed as a result of the mechanical movement (e.g., movement of a material in a plastic blow-molding machine, movement of a fluid through a pump, etc.).

FIG. 1 provides a representative controller 110 that can be used with the invention. The controller 110 includes an interface 120 (e.g., a switch, keyboard, key pad, or similar operator interface) to provide overall control of the motor 105, a contactor 125 that connects the motor 105 to a power source 130, a sensing module or a sensor 135 that senses operating parameters such as the amount of current drawn by the motor 105, a programmable processor or device 140 and a memory 145. The controller 110 can also include different and/or more sophisticated circuitry depending on the environment. For example, the controller 110 can include a rectifier/inverter combination or other driver for controlling the power to the motor. It is also envisioned that the controller 110 can include other circuitry not shown in the drawings that one skilled in the art would know to be present. For example, the controller 110 includes an analog-to-digital converter for converting the sensed current from an analog value to a digital value.

In the construction shown in FIG. 1, the sensor 135 is a current sensor such as SSAC current transducer TCSA10 having a response time of about 300 ms at 90-percent span arranged between the contactor 125 and the motor 105. However, in other constructions, outputs of the power source 130 are to fed to the sensor 135 before being fed to the contactor 125 and the motor 105. Furthermore, although the memory 145 is shown as an external component to the processor 140, the memory 145 can also be an internal memory integral with the processor 140. An exemplary processor is Rockwell International programmable logic controller 1763L16BWA having analog inputs with ten bit resolution, an execution time of about 3 ms, and an update time of about 100 ms.

Although FIG. 1 shows a current sensor, the controller 110 can include other sensors such as speed sensors, temperature sensors, torque sensors, pressure sensors, and the like, that determine other operating parameters of the motor 105. For example, a sensor 135 that includes speed sensors can determine a speed exhibited by the motor 105. A sensor 135 that includes temperature sensors can determine a temperature adjacent to windings of the motor 105. A sensor 135 that includes torque sensors can determine a torque value generated by the motor 105. As such, the controller 110 is not limited to using operating parameters such as current drawn by the motor 105 to provide control to the motor 105. Rather, the controller 110 can also use other operating parameters of the motor 105 such as speed, temperature, pressure, and torque to provide control to the motor 105.

Furthermore, the sensor 135 is configured to detect and monitor a condition of the motor 105 that is indicative of the operating parameters exhibited or produced by the motor 105. Collectively, values of signals output by the sensor 135 are referred to as sensed values, or values hereinafter. In some constructions, the sensor 135 is equipped with calibration circuitry or microprocessors therein, the amount of current can be converted internally to a calibrated form. Otherwise, the conditions can be converted into calibrated signals by other external processes in a manner known in the art. The sensor 135 can also include multiple internal sensors or sensing elements in a plurality of sensor arrays, for example, that may be coupled to the processor 140.

In the shown construction, the controller 110 includes one or more programmable devices 140 (e.g., one or more microprocessors, one or more microcontrollers, etc.) and the memory 145. The memory 145, which can include multiple memory devices, includes program storage memory and data storage memory. The programmable device 140 receives instructions and data from the memory 145, receives information (either directly or indirectly) from attached devices (e.g., the sensor 135) in communication with the programmable device 140, executes the received instructions and data, processes the received information, and communicates outputs to the attached devices (e.g., the contactor 125). It is envisioned that the programmable device 140 and memory 145 can be replaced by, for example, an application specific integrated circuit ("ASIC") and/or analog circuitry that performs the function of the programmable device 140 and memory 145 discussed herein. Other variations known to those skilled in the art are possible.

Figure 2:
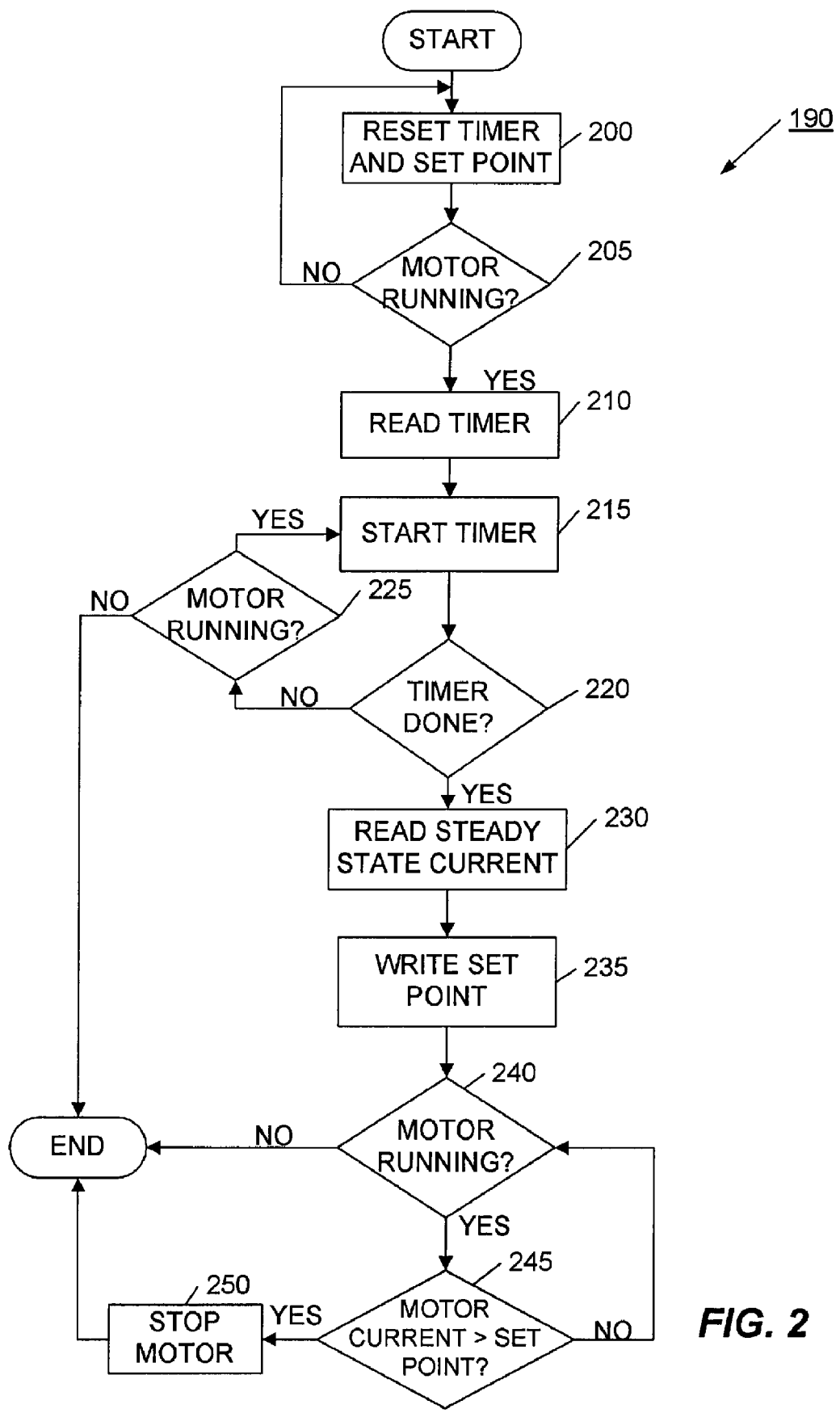
FIG. 2 is a block diagram of one exemplary method of operation for the load overload.

FIG. 2 includes a flow chart that further illustrates an automatic set-point jam overload detection process 190 that occurs in some constructions including processes that may be carried out by software, firmware, or hardware. The programmable device 140 receives an input from the interface 120 indicating a request to start the motor 105. In response, the programmable device 140 closes the contactor 125 and enters the process 190. In other constructions, however, a second control system (not shown) is configured to receive the input from the interface 120, and to start the motor 105 in response to the input. At block 200, the programmable device 140 resets a timer, an overload set point threshold, and other related parameters. At block 205, the programmable device 140 determines whether the motor 105 is running. If the programmable device 140 determines that the motor 105 is running ("Yes" path of block 205), the programmable device 140 proceeds to block 210. Otherwise, if the programmable device 140 determines that the motor 105 is not running ("No" path of block 205), the programmable device 140 returns to block 200.

At block 210, the programmable device 140 acquires a timer value (e.g., from the memory 145) after the motor 105 has started for an initial period of time such as 0.5 seconds. In some constructions, the timer value varies from about 1 second to about 10 seconds. At block 215, the programmable device 140 starts or increments the timer based on the timer value. The programmable device 140 then repeats blocks 220 and 225 until either when the timer has not run out ("No" path of block 220) and the motor 105 is no longer running ("No" path of block 225), or when the timer times out ("Yes" path of block 220). At block 230, the programmable device 140 reads a plurality of operating parameters of the motor 105 such as an amount of current drawn or a steady state current value from the sensor 135, and at block 235, determines and writes a set point threshold for the overload device 140 based on a portion of the determined operating parameters. In some constructions, the set point threshold can be a percentage (e.g., from about +0.5 percent to about +10 percent of a statistical value) above the statistical value derived from the portion of the operating parameters determined at block 230. Exemplary statistical values include averages, means, variances, standard deviations, and the like.

At block 240, the programmable device 140 determines whether the motor 105 is running. If the programmable device 140 determines that the motor 105 is running ("Yes" path of block 240), the programmable device 140 proceeds to block 245. Otherwise, if the programmable device 140 determines that the motor 105 is not running ("No" path of block 240), the automatic set-point jam overload detection process 190 terminates. In other constructions, if the programmable device 140 determines that the motor 105 is not running ("No" path of block 240), the programmable device 140 returns to block 200.

At block 245, the programmable device 140 determines from one value of the determined operating parameters such as the drawn motor current whether the one value of the determined operating parameters is greater than the set point threshold for a time period (e.g., about 8 ms). In some constructions, the one value of the determined operating parameters is a value from of the portion of the determined operating parameters. In other constructions, the one value of the determined operating parameters is a value of the operating parameters determined at block 230.

Thereafter, the controller 110 operates the motor 105 based on decisions generated at block 245. In some constructions, if the programmable device 140 determines that the one value of the determined operating parameters is greater than the set point threshold for the time period ("Yes" path of block 245), the motor 105 shuts down and an error is indicated at block 250 in a stop mode or stop level. In other constructions, if the programmable device 140 determines that the one value of the determined operating parameters is greater than the set point threshold for the time period ("Yes" path of block 245), the motor 105 runs at a level that corresponds to a portion of the rated capacity such as ten percent of the rated torque before shutting down and displaying the error at block 250 in a run mode or run level. In this way, the programmable device 140 initially slows down the motor 105 before shutting down the motor 105. If the programmable device 140 determines that the one value of the determined operating parameters is less than the set point threshold for the time period ("No" path of block 245), the programmable device 140 repeats block 240.

In still other constructions, after the programmable device 140 has determined the statistical value of the portion of the determined operating parameters and the percentage that can be used as the set-point threshold at block 235, the programmable device 140 proceeds to determine a first difference between the one value of the determined operating parameters and the statistical value also at block 235. At block 245, the programmable device 140 determines a second difference by comparing the first difference with the percentage. If the programmable device 140 determines that the first difference is greater than the percentage ("Yes" path of block 245), the programmable device 140 repeats block 250, as described earlier. Otherwise, if the first difference is not greater than the percentage ("No" path of block 245), the programmable device 140 repeats block 240, as described earlier.

Although FIG. 2 shows that the programmable device 140 executes operations at blocks 210-250 only once, the automatic set-point jam overload detection process 190 can also configure the programmable device 140 to execute operations at blocks 210-250 repeatedly. As an example, FIG. 3 shows a second automatic set-point jam overload detection process 190' which repeats a portion of the automatic set-point jam overload detection process 190 to adapt the set-point thresholds and the percentage (as determined at block 235) to the statistical value at various periods of operating time, wherein like blocks are referenced with like numerals.

Figure 3:
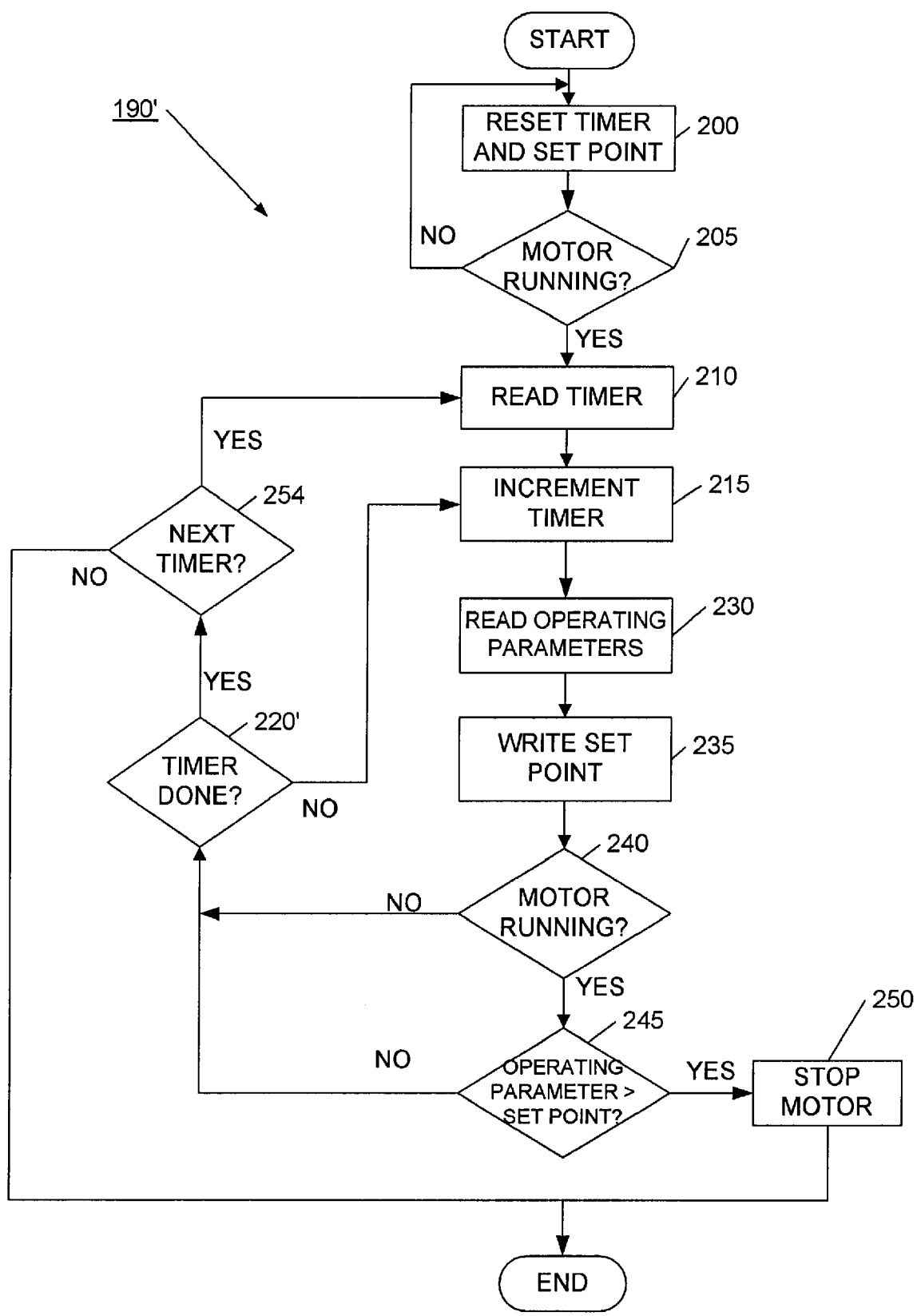
FIG. 3 is a block diagram of another exemplary method of operation for the load overload.

Particularly, as shown in FIG. 3, the programmable device 140 acquires a first timer value (such as about 1 second) at block 210, and executes the operations at blocks 215 through 250 as described below. At block 230, the programmable device 140 reads a plurality of operating parameters of the motor 105 from the sensor 135 as described. At block 235, the programmable device 140 determines and writes a set point threshold for the overload device 140 based on a portion of the determined operating parameters for a period of time that corresponds to the first timer value, as described above (with an exemplary overload set-point of about 3 percent above the statistical value.) The programmable device 140 repeats any operations necessary at blocks 240-250, as described above (with the portion having ten of the operating parameters, and an exemplary operating parameter sampling period of about 2 ms). The programmable device 140 then determines whether the timer has expired at block 220'.

If the programmable device 140 determines that the timer has expired ("Yes" path of block 220'), the programmable device 140 determines whether a next timer is needed at block 254. Otherwise, if the programmable device 140 determines that the timer has not expired ("No" path of block 220'), the programmable device 140 continues to read additional operating parameters.

If the programmable device 140 determines that a next timer is needed ("Yes" path of block 254), the programmable device 140 repeats block 210 to set up other timer values (such as 2 seconds), and adapts other overload set-point thresholds (such as about 1 percent and 0.5 percent above the statistical value) with the portion having about twenty of the operating parameters and different operating parameter sampling periods (such as about 2 ms and 100 ms). Otherwise, if the programmable device 140 determines that a next timer is not needed ("No" path of block 254), the programmable device 140 terminates the automatic set-point jam overload detection process 190'.

Therefore, the invention provides a new and useful load overload device. While numerous aspects of the apparatus 100 were discussed above, not all of the aspects and features discussed above are required for the invention. Additionally, other aspects and features can be added to the apparatus 100 shown in the figures. The constructions described above and illustrated in the figures are presented by way of example only and are not intended as a limitation upon the concepts and principles of the invention.

Various features and advantages of the invention are set forth in the following claims.

What is claimed is:

1. A method of controlling a vertical reciprocating conveyor having a motor, lifting apparatus, and path in which the lifting apparatus moves in response to a mechanical power produced by the motor, the method comprising:
 loading material into the lifting apparatus;
 determining if the motor has been started to move the vertical reciprocating conveyor and the material;
 reading an initial amount of current drawn by the motor required for the vertical reciprocating conveyor to move the material;
 determining a statistical value of the initial amount of current drawn by the motor;
 deriving a fixed steady state limit of the operating parameter from the statistical value and the initial amount of current drawn by the motor, wherein the fixed steady state limit remains fixed while the motor continues to drive the vertical reciprocating conveyor and the material, and wherein the limit remains independent of how far the vertical reciprocating conveyor has moved;
 moving the vertical reciprocating conveyor with the material after the fixed steady state limit has been derived;
 reading a subsequent amount of current drawn by the motor after the vertical reciprocating conveyor has started to move the material;
 comparing the subsequent amount and the fixed steady state limit; and
 stopping the motor when the subsequent amount is above the fixed steady state limit for a period of time.

2. The method of claim 1, wherein reading an initial amount of current drawn comprises sensing the initial amount of current drawn by the motor after the current drawn by the motor has started to decrease after the motor has started.

3. The method of claim 1, wherein reading the initial amount of current drawn comprises sensing the initial amount of current drawn by the motor after the motor has started for a period of time.

4. The method of claim 1, wherein determining the statistical value comprises determining an average, a mean, a variance, and a standard deviation of the initial amount of current drawn by the motor.

5. The method of claim 1, wherein deriving a fixed steady state value comprises summing the initial amount of current and the statistical value.

6. A control system for a machine having a motor, lifting apparatus into which material is loaded, and path in which the lifting apparatus moves in response to a mechanical power produced by the motor, the system comprising:
 a sensing module configured to read a steady state operating parameter of the motor after the motor has started to move the machine and the material, and a subsequent value of the operating parameter; and
 a controller configured to set a fixed operating parameter from the steady state operating parameter, wherein the fixed operating parameter remains fixed while the motor is driving the machine, and wherein the fixed operating parameter remains independent of how far the machine has moved, to compare the subsequent value of the operating parameter with the fixed operating parameter while the machine is moving, and to stop the motor when the subsequent value of the operating parameter is greater than the fixed operating parameter for a period of time.

7. The system of claim 6, wherein the operating parameter comprises one of an amount of current drawn by the motor, a speed exhibited by the motor, a temperature of the motor, a pressure exhibited by the motor, and a torque generated by the motor.

8. The system of claim 6, wherein the controller is further configured to determine the fixed operating parameter based on a statistical value comprising one of an average, a mean, a variance, and a standard deviation of the operating parameter of the motor.

9. The system of claim 8, wherein the controller is further configured to set the fixed operating parameter above the statistical value.

* * * * *